United States Patent
Hamada et al.

(10) Patent No.: US 8,083,243 B2
(45) Date of Patent: Dec. 27, 2011

(54) DRIVE UNIT VIBRATION DAMPING SUPPORT FOR ELECTRIC MOTOR-DRIVEN VEHICLE

(75) Inventors: Masaaki Hamada, Kounan (JP); Masahiro Ohnishi, Aichi (JP)

(73) Assignee: Tokai Rubber Industries, Ltd., Komaki-Shi (JP)

(*) Notice: Subject to any disclaimer, the term of this patent is extended or adjusted under 35 U.S.C. 154(b) by 0 days.

(21) Appl. No.: 13/056,875

(22) PCT Filed: May 12, 2010

(86) PCT No.: PCT/JP2010/003227
§ 371 (c)(1),
(2), (4) Date: Feb. 14, 2011

(87) PCT Pub. No.: WO2010/134297
PCT Pub. Date: Nov. 25, 2010

(65) Prior Publication Data
US 2011/0127094 A1 Jun. 2, 2011

(30) Foreign Application Priority Data
May 19, 2009 (JP) ................................. 2009-121305

(51) Int. Cl.
*B60G 3/00* (2006.01)
*B60G 13/00* (2006.01)
(52) U.S. Cl. .................................. 280/124.1; 180/65.51
(58) Field of Classification Search .................. 180/291, 180/299, 65.51; 280/124.1, 124.109, 124.135, 280/124.136
See application file for complete search history.

(56) References Cited

U.S. PATENT DOCUMENTS

| | | | | |
|---|---|---|---|---|
| 4,881,752 A * | 11/1989 | Tanaka | ................... | 280/124.128 |
| 5,000,477 A * | 3/1991 | Minakawa et al. | .... | 280/124.136 |
| 5,087,229 A * | 2/1992 | Hewko et al. | ................ | 475/149 |
| 5,415,427 A * | 5/1995 | Sommerer et al. | ..... | 280/124.142 |
| 6,085,858 A * | 7/2000 | Wakana et al. | ............... | 180/300 |
| 6,981,696 B2 * | 1/2006 | Hatano et al. | ............ | 267/140.12 |

(Continued)

FOREIGN PATENT DOCUMENTS

JP A-7-156663 6/1995

(Continued)

OTHER PUBLICATIONS

International Search Report dated Aug. 17, 2010 in corresponding International Application No. PCT/JP2010/003227.

*Primary Examiner* — J. Allen Shriver, II
*Assistant Examiner* — Jacob Meyer
(74) *Attorney, Agent, or Firm* — Oliff & Berridge PLC

(57) ABSTRACT

A drive unit vibration damping support for use in an electric motor-driven vehicle combines the following structural features. A subframe construction in which a drive unit is supported in vibration damping fashion on a subframe through a first vibration damping device, and the subframe is supported in vibration damping fashion on a vehicle through a second vibration damping device. A total spring constant of the first vibration damping device in a direction of input of torque reaction force of the drive unit is larger than a total spring constant of the second vibration damping device. An average value of a distance between a torque roll axis of the drive unit and the second vibration damping device is greater than an average value of a distance between the torque roll axis and the first vibration damping device.

6 Claims, 2 Drawing Sheets

U.S. PATENT DOCUMENTS

| | | | |
|---|---|---|---|
| 7,118,119 B2 * | 10/2006 | Amanuma | 280/124.135 |
| 7,140,603 B2 * | 11/2006 | Maeno et al. | 267/140.13 |
| 7,306,065 B2 * | 12/2007 | Nagaya | 180/65.51 |
| 7,445,076 B2 * | 11/2008 | Shigematsu | 180/299 |
| 7,588,117 B2 * | 9/2009 | Fukuda | 180/291 |
| 7,703,780 B2 * | 4/2010 | Mizutani et al. | 280/124.1 |
| 7,735,588 B2 * | 6/2010 | Murata | 180/65.51 |
| 7,784,807 B2 * | 8/2010 | Brandl et al. | 280/124.135 |
| 7,789,178 B2 * | 9/2010 | Mizutani et al. | 180/65.51 |
| 7,874,395 B2 * | 1/2011 | Taji et al. | 180/300 |
| 7,878,511 B2 * | 2/2011 | Haeusler et al. | 280/5.52 |
| 7,980,350 B2 * | 7/2011 | Oriet et al. | 180/252 |
| 2004/0099455 A1 * | 5/2004 | Nagaya | 180/65.5 |
| 2007/0051549 A1 * | 3/2007 | Fukuda | 180/232 |
| 2009/0218783 A1 * | 9/2009 | Brandl et al. | 280/124.135 |

FOREIGN PATENT DOCUMENTS

| | | |
|---|---|---|
| JP | B2-3767323 | 4/1996 |
| JP | A-9-215104 | 8/1997 |
| JP | A-2001-193781 | 7/2001 |
| JP | A-2004-161260 | 6/2004 |
| JP | A-2005-22554 | 1/2005 |
| JP | A-2006-248417 | 9/2006 |
| JP | A-2007-161168 | 6/2007 |
| JP | B2-3932025 | 6/2007 |
| JP | A-2007-237756 | 9/2007 |
| JP | A-2007-245890 | 9/2007 |
| JP | A-2007-307996 | 11/2007 |
| JP | B2-4110567 | 7/2008 |
| JP | B2-4135915 | 8/2008 |
| WO | WO 2002/083446 | 10/2002 |

* cited by examiner

DRIVE UNIT VIBRATION DAMPING SUPPORT FOR ELECTRIC MOTOR-DRIVEN VEHICLE

TECHNICAL FIELD

The present invention relates to a drive unit vibration damping support of novel construction designed to provide vibration damping support of an electric motor unit on a vehicle body in an electric vehicle that employs an electric motor as the drive source.

BACKGROUND ART

In view of a recent increase in concerns about the global environment, there have been proposed a number of electric vehicles, such as battery powered vehicles and fuel cell powered vehicles, which rely on an electric motor instead of an internal combustion engine as the drive source.

In the electric vehicles proposed to date, the structure contemplated to replace the conventional power unit that includes an internal combustion engine is simply a modified drive unit that includes a drive motor. Consequently, mounting systems for mounting the drive unit on the vehicle body, such as that disclosed for example in JP-A 7-156663 (Patent Document 1), have retained generally the same construction as mounting systems for conventional power units that include an internal combustion engine.

However, research conducted by the inventors led to the conclusion that where a drive unit vibration damping support for an electric vehicle has generally the same structure as a conventional mounting unit for a internal combustion engine, it is extremely difficult to achieve the vibration damping characteristics desired in an electric vehicle. A possible technical reason is that an electric motor and an internal combustion engine differ not only in terms of their construction, but also significantly in terms of their output characteristics, and thus there is considerable divergence in relation to their required characteristics, as well as the vibration damping support that would be appropriate for achieving these.

As a specific example, an electric motor develops high torque in a low speed range, whereas an internal combustion engine develops high torque in a high speed range, and thus there is a great difference in the characteristics of the drive torque reaction force to which the vibration damping support is subjected. Additionally, whereas vibration damping of idling vibration when the vehicle is at an idle is a requirement of mounting systems for internal combustion engines, the drive unit of an electric vehicle lacks an idling condition, and thus there is no need for a vibration damping support for such a unit to provide vibration damping of idling vibration. Moreover, in an electric motor, depending on the number of magnets and coils, vibration caused by output torque fluctuations may occur several times to several tens of times during each one revolution of the output shaft of the electric motor, whereas in a four-cycle internal combustion engine, vibration does not occur more than once during each two revolutions of the crankshaft. For this reason, the frequency of vibrations caused by torque fluctuations differ greatly, resulting in a major difference in the vibration damping characteristics that are required. The technical basis for the inventors' finding that support structures for conventional power units containing an internal combustion engine are inappropriate for use as support structures for drive units containing an electric motor may be understood in consideration of the above findings.

PRIOR ART DOCUMENT

Patent Citation

Patent Document 1: JP-A-7-156663

SUMMARY OF THE INVENTION

Problem the Invention Attempts to Solve

With the foregoing in view, it is an object of the present invention to provide a drive unit vibration damping support of novel design adapted specifically for electric vehicles, and completely different from a conventional power unit mounting system for an internal combustion engine.

Means for Solving the Problem

The above objects may be attained according to the following modes of the invention, and the following elements employed therein may be adopted at any possible optional combinations.

A first mode of the present invention provides a drive unit vibration damping support for use in an electric motor-driven vehicle to provide vibration damped support of a drive unit including an electric motor on a vehicle body, being characterized in that a first vibration damping device is provided to support the drive unit in vibration damping fashion on a subframe; a second vibration damping device is provided to support the subframe in vibration damping fashion on the vehicle body; a spring constant of the first vibration damping device in a direction of input of torque reaction force of the electric motor is set to a greater value than a spring constant of the second vibration damping device; and an average of a distance between a torque roll axis of the drive unit and the second vibration damping device is set to a greater value as compared with a average of a distance between the torque roll axis and the first vibration damping device.

According to the first mode, in an electric motor-driven vehicle, it is possible to achieve both improved transmission efficiency of drive torque and exceptional vibration damping ability. Specifically, with a drive unit having an electric motor as the drive source, unlike a conventional power unit that uses an internal combustion engine, idling vibration does not occur when the vehicle is at an idle. The drive unit vibration damping support of the present invention focuses on these unique vibration characteristics of electric motor-driven vehicles, and sacrifices vibration damping ability against middle frequency vibration that corresponds to the idling vibration of an internal combustion engine. This makes it possible to improve drive torque transmission efficiency, and to establish a high frequency setting for the rigid body resonance frequency of the drive unit, through a specific placement of the first vibration damping device and the second vibration damping device, as well as their spring constant settings.

More concretely, in the first vibration damping device which is situated a shorter distance away from the torque roll axis of the drive unit, a high spring constant is provided in the direction of input of torque reaction force, thus affording a high level of support spring rigidity with respect to torque reaction force. Displacement, e.g. rocking, of the drive unit due to torque reaction force is reduced thereby, and drive torque may be transmitted more efficiently to the vehicle wheel for improved acceleration and accelerator response.

Specifically, in a mounting system for a conventional internal combustion engine, if the vibration damping unit intervening between the power unit and the subframe has a high spring constant in the direction of torque reaction force, satisfactory vibration damping ability against idling vibration and engine vibration at low engine speed, which occur at around 20 to 40 Hz, cannot be obtained, making such an arrangement impractical. In an internal combustion engine, torque fluctuations associated with firing are very large, and this means that to maintain vibration transmissibility during idling or at low engine speed down at practical levels it is necessary to set the resonance frequency of the power unit vibration damping device to a lower frequency than idling frequency. However, the electric motor-driven vehicle to which the present invention is directed does not experience idling, and moreover torque fluctuations at low engine speed are very small, and the torque fluctuation frequency at low engine speed is also much higher as compared with an internal combustion engine. For these reasons, with a drive unit vibration damping support intended for use in an electric motor-driven vehicle, the spring constant of the first vibration damping device in the torque reaction force direction can be quite high while still maintaining good vibration damping capabilities against vibration such as drive rumble caused by torque fluctuations. This makes it possible accordingly to attain a drive unit vibration damping support for use in an electric motor-driven vehicle, with excellent drive torque transmission efficiency as stated previously.

The second vibration damping device has a lower spring constant in the torque reaction force input direction than does the first vibration damping device but is separated by a greater distance from the torque roll axis, and thus in relation to support spring rigidity with respect to torque reaction force, the spring characteristics of the first vibration damping device are dominant as compared with the second vibration damping device. Moreover, for reasons relating to the construction of the subframe, input load for the second vibration damping device is greater than for the first vibration damping device, and therefore the spring constant of the second vibration damping device somewhat higher so as to ensure load bearing capability. For this reason, support spring rigidity with respect to torque reaction force is exhibited effectively by the first vibration damping device, and excellent drive torque transmission efficiency may be achieved as noted earlier.

Moreover, by establishing a high spring constant in the torque reaction force input direction for the first vibration damping device, a high frequency is established for the rigid body resonance frequency of the drive unit composed of a vibration system in which the drive unit constituting the mass is elastically supported by a spring that includes the first vibration damping device. For this reason, with respect to rigid body resonance arising in the drive unit due to vibrating force input from the wheel assembly (vehicle wheel) as well, vibration due to this resonance may be avoided within a practical speed range, affording further improvement in vehicle vibration damping capability.

A second mode of the present invention provides a drive unit vibration damping support for an electric motor-driven vehicle according to the first mode, wherein the subframe is supported in vibration damping fashion on the vehicle body by a plurality of the second vibration damping devices situated towards a front end and towards a rear end of the vehicle; support spring characteristics of the drive unit by the second vibration damping devices situated towards the front end differs from support spring characteristics of the drive unit by the second vibration damping devices situated towards the rear end; and pitching resonance and bouncing resonance in the subframe are generated in coupled fashion.

According to the present mode, pitching resonance (rocking resonance in the vehicle lengthwise direction about an axis of rock extending in the vehicle sideways direction) and bouncing resonance (resonance in the vehicle vertical direction) arising in the subframe are actively coupled, whereby the vibration level peaks of pitching resonance and bouncing resonance may be kept in check. Specifically, energy of vibration produced by either pitching resonance or bouncing resonance can be dispersed to the other, making it possible to prevent vehicle vibration damping capabilities from being adversely affected by extremely high vibration peak levels.

In particular, according to the present invention, the distance of the second vibration damping device from the torque roll axis is greater than that of the first vibration damping device, and support spring rigidity of torque reaction force is assured by the first vibration damping device. Therefore, a high degree of freedom is assured in setting of the spring characteristics of the second vibration damping device. It is accordingly a simple matter to effect reciprocal tuning of pitching resonance and bouncing resonance to more effectively realize reduction of vibration based on coupling of both modes of vibration as described above.

A third mode of the present invention provides a drive unit vibration damping support for an electric motor-driven vehicle according to the second mode, wherein in a fundamental mode of vibration arising from coupling of pitching vibration and bouncing vibration in the subframe, a node of a vibration mode is biased towards either one of the front end and the rear end of the vehicle; and of the plurality of second vibration damping devices situated towards the front end and the rear end of the vehicle, one of the second vibration damping devices situated a longer distance away from the node of the vibration mode have higher attenuation characteristics in a direction of input of pitching vibration and bouncing vibration, than another of the second vibration damping devices situated a shorter distance away from the node of the vibration mode.

According to the present mode, high attenuation characteristics with respect to fundamental vibration (resonance having larger amplitude) of the subframe are effectively exhibited by the second vibration damping devices with larger amplitude displacement, thus reducing resonance displacement of the subframe and minimizing the drop of vehicle vibration. In particular, by coupling the resonance of the subframe to actively assure a satisfactory amplitude ratio for the front end second vibration damping devices and the rear end second vibration damping devices, it is possible to more effectively achieve high attenuation characteristics in those second vibration damping devices that give rise to large amplitude.

A fourth mode of the present invention provides a drive unit vibration damping support for an electric motor-driven vehicle according to the any one of the first to third modes wherein the drive unit is loaded onto the subframe via the first vibration damping device, and the subframe is subjected to a weight of the drive unit in addition to the drive torque reaction force of the drive unit.

According to this mode, substantially the entire weight of the drive unit is supported on the vehicle body via the subframe. With this support structure for the drive unit by the subframe, the problem of exacerbated vehicle vibration in association with resonance of the subframe tends to arise owing to the high weight of the subframe which is elastically supported on the vehicle body via the second vibration damping device. Nevertheless, improved vibration damping capability may be obtained through implementation of the invention, and the vibration associated with resonance of the subframe may be effectively prevented through concomitant implementation with the second or third mode in particular.

A fifth mode of the present invention provides a drive unit vibration damping support for an electric motor-driven vehicle according to the any one of the first to third modes, wherein the drive unit is installed inside a rim of a vehicle wheel to constitute an in-wheel motor structure; and the drive unit is connected to and supported on the subframe via a wheel assembly suspension member, and the first vibration damping device is constituted by a suspension vibration damping device disposed in a zone of transmission of the torque reaction force of the drive unit from the wheel assembly suspension member to the subframe.

According to this mode, in relation to an in-wheel motor structure, which represents an electric motor drive unit support structure completely different in design from the power unit support structure for a conventional internal combustion engine, it is possible to implement a novel and useful drive unit retention mechanism design utilizing a subframe structure. In particular, by making it possible to implement the subframe structure in an in-wheel motor structure as well, effective damping not only of vibration transmitted from the drive unit to the vehicle body, but also of vibration input to the vehicle body from the road surface through the wheel assembly, may be effectively achieved through a duplex vibration damping mechanism composed of the first vibration damping device and the second vibration damping device. Moreover, by adopting specific placement locations and specific spring characteristics for the first vibration damping device and the second vibration damping device, it is possible to attain excellent vibration damping capabilities, while ensuring ample support spring rigidity with regard to drive torque reaction force to achieve excellent drive torque transmission efficiency.

A sixth mode of the present invention provides a drive unit vibration damping support for electric motor-driven vehicle use according to the fifth mode wherein at least one of a shock absorber and a spring installed between the vehicle wheel and the vehicle body is attached to the vehicle body via the subframe.

According to the present mode, it is possible for road surface vibration transmitted from the wheel assembly to the vehicle body via the shock absorber or spring to be effectively reduced through utilization of the subframe structure which has been implemented in the in-wheel motor structure discussed above.

EFFECT OF THE INVENTION

By adopting specific spring characteristics and placement locations for the first vibration damping device that provides vibration damping linkage of the drive unit to the subframe and for the second vibration damping device that provides vibration damping linkage of the subframe to the vehicle body, the present invention accomplishes both improved transmission efficiency of drive torque to the wheel assembly, as well as excellent vibration damping capabilities against types of vibration that present problems in an electric motor-driven vehicle.

EMBODIMENTS FOR CARRYING OUT THE INVENTION

A fuller understanding of the present invention is provided by the following detailed description of the embodiments with reference to the accompanying drawings.

Figure 1:
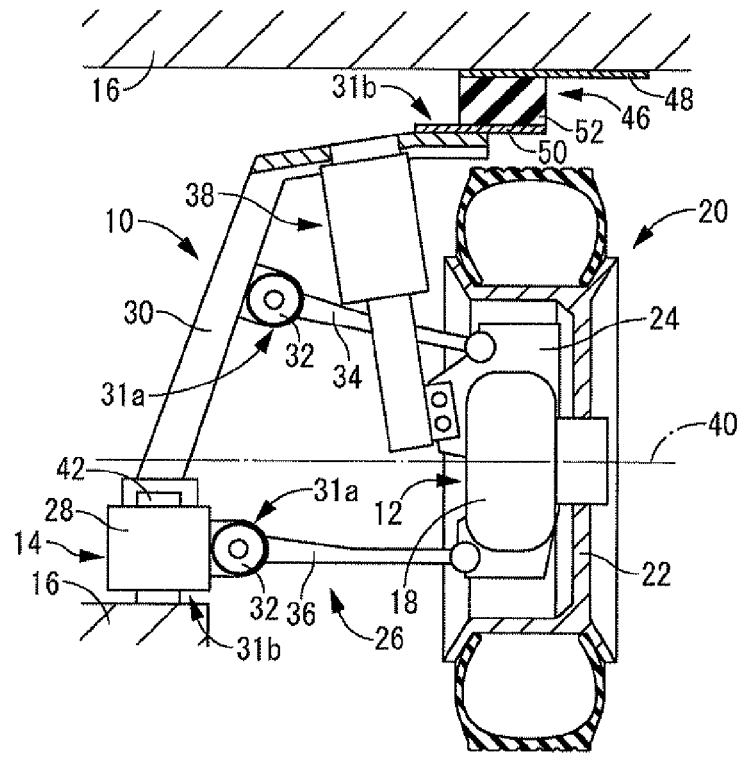
FIG. 1 is a schematic cross sectional view of a drive unit vibration damping support according to a first embodiment of the present invention.

FIG. 1 depicts as a first embodiment of the present invention a drive unit vibration damping support 10 for use in an electric motor-driven vehicle. In this drive unit vibration damping support 10, a drive unit 12 having in-wheel motor construction is supported in vibration damping fashion on a vehicle body 16 via a subframe 14.

The drive unit 12 configuration includes an electric motor 18 equipped with a shift gear mechanism. The motor housing of this electric motor 18 is disposed accommodated to the inside peripheral side of the rim of a wheel 22 of a wheel assembly 20, and is supported by a wheel assembly support member (a member situated to the wheel knuckle side) 24 to which the brake caliper is attached. The output shaft of the electric motor 18 is linked to the wheel 22 via the shift gear mechanism in the manner taught in JP-A 2006-248417 and JP-A 2005-22554, so that drive power may be transmitted from the electric motor 18 to the wheel assembly 20.

The wheel assembly support member 24 is attached to the vehicle body 16 via a wheel assembly suspension member 26. On the vehicle body 16, the subframe 14 is installed on the mounting section of the wheel assembly suspension member 26, and the wheel assembly support member 24 is linked to the subframe 14 by the wheel assembly suspension member 26. That is, the wheel assembly support member 24 is attached to the vehicle body 16 by the wheel assembly suspension member 26, via the subframe 14.

Figure 2:
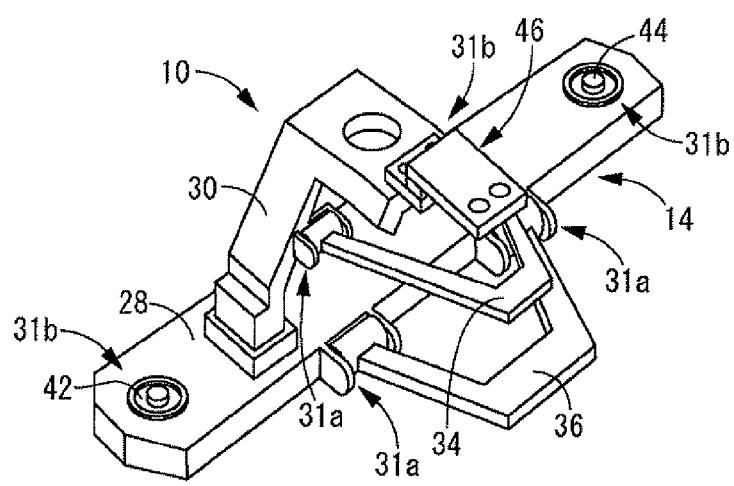
FIG. 2 is a schematic perspective view of a principle part of the drive unit vibration damping support.

The subframe 14 is a high rigidity component made of steel or the like, and as shown in FIG. 2 has prescribed length in the vehicle lengthwise direction. The subframe 14 includes a base portion 28 extending in the vehicle lengthwise direction, and a tower portion 30 that protrudes upward from the medial section of the base portion 28 in the vehicle lengthwise direction. However, the specific form of the subframe 14 may be selected appropriately with reference to a particular vehicle body, suspension mechanism, and so on, and is not limited to that shown in the present embodiment.

A plurality of mounting portions 31a for the wheel assembly suspension member 26 are disposed in the medial section in the vehicle lengthwise direction of the subframe 14, and mounting portions 31b for mounting the subframe 14 onto the vehicle body 16 are disposed in proximity to the two ends in the vehicle lengthwise direction and in proximity to the top edge, of the subframe 14.

Specifically, a total of four mounting portions 31a for the wheel assembly suspension member 26 are provided, two situated a prescribed distance apart in the vehicle lengthwise direction on the base portion 28, and two situated a prescribed distance apart in the vehicle lengthwise direction on the tower portion 30. Meanwhile, a total of three mounting portions 31b for the purpose of mounting on the vehicle body 16 are provided in the two end sections in the vehicle lengthwise direction on the base portion 28 and in the upper end section of the tower portion 30.

Suspension bushings 32 provided as suspension vibration damping devices are attached to each of the mounting portions 31a of the wheel assembly suspension member 26. These suspension bushings 32 may be components of known design disclosed inter alia in JP-A 2007-245890, and are constructed, for example, from an outer tubular fitting spaced apart to the outside peripheral side of an inner shaft fitting, with the inner shaft fitting and the outer tubular fitting linked together by a main rubber elastic body.

These suspension bushings 32 are attached to each mounting portion 31a such that the inner shaft fitting of the suspension bushing 32 is supported facing in the vehicle lengthwise direction by the subframe 14. The wheel assembly suspension member 26 is linked to the outer tubular fitting. The wheel assembly suspension member 26 is composed of a suitable arm or the like, selected according to particular suspension mechanisms of various known designs.

For example, as illustrated in the drawings, the wheel assembly suspension member 26 may include an upper arm 34 and a lower arm 36 constituting a wishbone type suspension. The upper arm 34 and the lower arm 36 are generally 'A' shaped or 'L' shaped arms, and are each fixed at two locations on the basal end side thereof to the outer tubular fitting of the suspension bushing 32. The upper arm 34 and the lower arm 36 are attached at the distal end side thereof to the wheel assembly support member 24 via a ball joint. The wheel assembly 20 is thereby linked to the subframe 14 via the wheel assembly suspension member 26, such that the assembly is positioned in the vehicle lengthwise direction and is supported rockably in the vehicle vertical direction in steerable fashion.

The suspension mechanism of the present embodiment has a strut mechanism. Specifically, the lower end of a shock absorber 38 of telescopic design oriented extending upward on the diagonal is affixed to the wheel assembly support member 24, with the upper end of the shock absorber 38 attached in proximity to the top end of the tower portion 30 of the subframe 14. If needed, an appropriate upper support may be interposed at the site of attachment of the shock absorber 38 upper end to the tower portion 30. This upper support may employ any of various known designs such as that disclosed in JP-A 2001-193781.

While not shown explicitly in the drawings, in accordance with known strut construction, a coil spring, air spring, or the like is installed on the shock absorber 38, and through the urging force of this coil spring the wheel assembly 20 which has been linked to the subframe 14 elastically supports the weight of the vehicle. It may be readily appreciated that the shock absorber 38 constituting part of the strut structure is intended to support vertical load of the vehicle, and is not intended to receive reaction force (drive reaction force, braking reaction force, cornering force, etc.) acting in the direction of rotation of the wheel assembly 20 for example.

Specifically, the drive unit 12 which includes the electric motor 18 is supported in vibration damping fashion through linkage to the subframe 14 via the upper arm 34, lower arm 36, and shock absorber 38 that make up the wheel assembly suspension member 26. Because the shock absorber 38 does not bear any portion of reaction force acting in the direction of rotation of the wheel assembly 20, drive torque reaction force about the torque roll axis 40 of the drive unit 12 is exerted on the subframe 14 from the upper arm 34 and the lower arm 36, via the suspension bushings 32, 32, 32, 32. That is, while the vibration damping device for the wheel assembly suspension member 26 may include the upper support in addition to the suspension bushings 32, 32, 32, 32, the first vibration damping device of the present invention, which is directed to the problem of characteristics such as the spring constant in the torque reaction force input direction, includes the suspension bushings 32, 32, 32, 32 only, and does not include the upper support or the like.

Meanwhile, subframe mounts 42, 44, 46 provided as the second vibration damping devices are installed in the three mounting portions 31b used to mount the subframe 14 onto the vehicle body 16. These subframe mounts 42, 44, 46 are not limited in terms of specific structures, which may be selected according to the required vibration damping characteristics.

For example, as illustrated, the subframe mount 42 installed in the mounting portion 31b situated at the vehicle front end side of the base portion 28, and the subframe mount 44 installed in the mounting portion 31b situated at the vehicle rear end side of the base portion 28, may constitute tubular vibration damping devices having an outer tubular fitting positioned spaced apart to the outside peripheral side of an inner shaft fitting, and linked thereto by a main rubber elastic body. By securing the outer tubular fitting through pressure fitting into a mounting hole formed in the base portion 28, these subframe mounts 42, 44 are attached with the mount center axis oriented in the vehicle vertical direction, and are installed with the inner shaft fitting thereof secured to the vehicle body 16. A rubber elastic body 52 is interposed between the opposed faces of a first mounting fitting 48 and a second mounting fitting 50, and the subframe mount 46 installed at the upper end of the tower portion 30 is anchored to the two mounting fittings 48, 50. The first mounting fitting 48 is then attached to one of the vertically opposed sections of the tower portion 30 top end and the vehicle body 16, while the second mounting fitting 50 is attached to the other.

Drive torque reaction force exerted on the subframe 14 from the drive unit 12 via the wheel assembly suspension member 26 is borne by the vehicle body 16 via the subframe mounts 42, 44, 46.

Here, specific relative relationships among spring constants and placement locations about the torque roll axis 40 (which represents the center axis of drive torque reaction force exerted on the wheel assembly 20 from the drive unit 12 by the electric motor 18) are established for the suspension bushings 32, 32, 32, 32 which constitute the first vibration damping devices and the subframe mounts 42, 44, 46 which constitute the second vibration damping devices.

Specifically, turning first to relative relationships among spring constants, the sum of the spring constants about the torque roll axis 40 in the suspension bushings 32, 32, 32, 32 which constitute the first vibration damping devices is greater than the sum of the spring constants about the torque roll axis 40 in the subframe mounts 42, 44, 46 which constitute the second vibration damping devices. Specifically, it is typical practice to establish a greater spring constant for a rubber mount the greater the load to be placed on it. However, in the present embodiment, in contrast to this, the suspension bushings 32, 32, 32, 32 which are installed at the mounting locations for the upper arm 34 and the lower arm 36, which are lower in weight than the subframe 14, have total spring constant that is greater than that of the subframe mounts 42, 44, 46. In preferred practice, in any individual vibration damping device subjected to drive torque reaction force as well, the suspension bushings 32, 32, 32, 32 have greater spring constant about the torque roll axis 40 than do the subframe mounts 42, 44, 46. For the suspension bushings 32, 32, 32, 32 the load input direction about the torque roll axis 40 is the approximately axis-perpendicular direction approximately aligned with the vertical direction of the vehicle; for the subframe mounts 42 and 44 this direction is the approximately axial direction approximately aligned with the vertical direction of the vehicle; and for the subframe mount 46 this direction is the direction approximately orthogonal to the direction of opposition of the first and second mounting fittings 48, 50, approximately aligned with the lengthwise direction of the vehicle.

Turning next to relative relationships among placement locations, the average value of the distance of separation of the suspension bushings 32, 32, 32, 32 which constitute the first vibration damping devices from the torque roll axis 40 is smaller than the average value of the distance of separation of the subframe mounts 42, 44, 46 which constitute the second vibration damping devices from the torque roll axis 40. In preferred practice, in any individual vibration damping device subjected to drive torque reaction force as well, the suspension bushings 32, 32, 32, 32 have smaller distance of separation from the torque roll axis 40 than do the subframe mounts 42, 44, 46. Distance of separation refers to the distance between the torque roll axis 40 and a principal axis of elasticity extending in an approximately tangential direction to a circle centered on the torque roll axis 40 in each vibration damping device, and is represented as distance along a straight line orthogonal to the torque roll axis 40.

Figure 3:
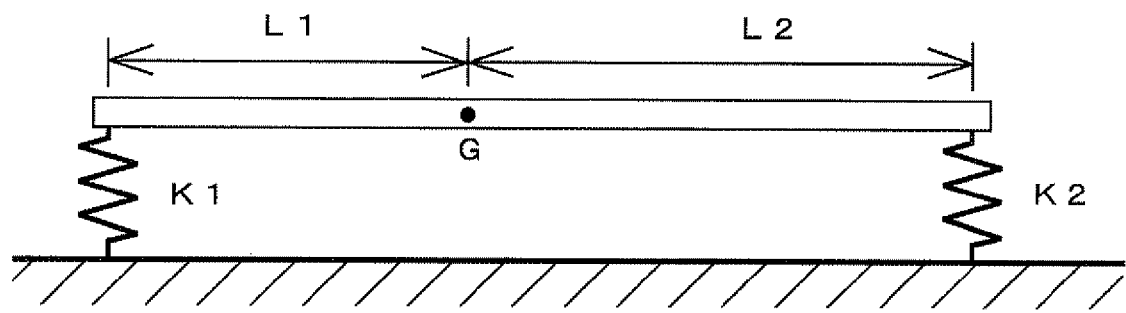
FIG. 3 is a diagram for depicting a two-degree-of-freedom vibration system in subframe.

In relation to the elastic support characteristics of the subframe 14 by the subframe mounts 42, 44, 46, it is more preferable for the spring characteristics of these individual subframe mounts 42, 44, 46 to be established such that coupling is created between pitching vibration (rotational motion) that arises in the subframe 14 about an axis of rock that extends in the vehicle lateral direction approximately parallel to the torque roll axis 40, and bouncing vibration that arises in the subframe 14 as translational reciprocating motion in the vehicle vertical direction. As a specific example, simplifying through synthesis of the spring constants of the three subframe mounts 42, 44, 46, let us assume a subframe 14 represented as a rigid beam in a two-degree-of-freedom vibration system is elastically supported at either end in the vehicle lengthwise direction as depicted in FIG. 3. Where k1 denotes the support spring constant of the front mount, k2 denotes the support spring constant of the rear mount, L1 denotes the distance of the front mount from the center of gravity G, and L2 denotes the distance of the rear mount from the center of gravity G, these values are established so as to fulfill the following expression:

$$L1 \times k1 \neq L2 \times k2.$$

Still more preferably, in the vibration system of FIG. 3 representing in model form a subframe 14 wherein pitching vibration and bouncing vibration are coupled, the attenuation coefficient of the mount situated at the end where larger amplitude of fundamental vibration is observed is greater than that of the mount situated at the end where smaller amplitude is observed. This could be accomplished, for example, by forming the vehicle front end subframe mount 42 and the vehicle rear end subframe mount 44 using main rubber elastic bodies of rubber materials with mutually different attenuation coefficients, to produce different mount structures. Specifically, this may be advantageously achieved by employing a fluid-filled subframe mount like that taught in JP-B2-4110567 at the large-amplitude end, while employing a subframe mount of solid type like that taught in JP-B2 3932025 at the small-amplitude end.

In the vibration system of this subframe 14, the resonance frequency at the low frequency end representing the fundamental frequency is preferably established within a range of between 30 Hz and 350 Hz, and more preferably established so as to produce a fundamental frequency of between 40 Hz and 200 Hz. If the fundamental frequency of the subframe 14 is lower than 30 Hz, there is a risk that resonance of the subframe 14 in response to vibrating force from the wheel assembly 20 will be a problem; whereas above 350 Hz it becomes difficult to achieve sufficient vibration isolation effect against noise caused by drive torque of the electric motor 18.

In the vibration system of the subframe 14 depicted in model form in FIG. 3, the resonance frequency ($\omega$) may be derived as follows:

$$\omega^2 = \tfrac{1}{2}(kx/M + k\theta/J) \pm \sqrt{\tfrac{1}{4}(kx/M - k\theta/J)^2 + kx\theta^2/MJ}.$$

kx represents spring constant (kN/m) in the vertical direction and is derived as k1+k2. M denotes total mass (Kg) of the subframe inclusive of carried load. k$\theta$ represents rotational spring constant and is derived as k1$\times$L1$^2$+k2$\times$L2$^2$. J represents the moment of inertia (Kg·m$^2$) about the center of gravity in the subframe inclusive of carried load. x represents vertical displacement of the center of gravity (G), $\theta$ represents rotation angle about the center of gravity (G), and kx$\theta$ is derived as k1$\times$L1−k2$\times$L2.

Thus, through adjustment of the spring constants and placement locations of the subframe mounts 42, 44, 46, the two resonance frequencies ($\omega$) represented by coupled vibration may be tuned to the intended frequency range mentioned earlier.

The amplitude ratio (A/$\Theta$) of the amplitude (A) of bounce vibration and the amplitude ($\Theta$) of pitching vibration in the end sections of the subframe 14 is represented by the following expression:

$$(A/\Theta) = kx\theta/(kx - M\omega^2) = (k\theta - J\omega^2)/kx\theta.$$

Thus, from among the two resonance frequencies ($\omega$) represented by coupled vibration, by deriving vibration mode from the amplitude ratio at a fundamental frequency of large amplitude, it will be appreciated that it is acceptable to increase the attenuation coefficient in the vibration damping device at either the front end or the rear end of the subframe 14. Specifically, in the present embodiment, of the subframe mount 42 at the front and the subframe mount 44 at the rear, it is found effective to select a greater attenuation coefficient in that mount which is situated further away from the node of the mode of pitching vibration.

According to the drive unit vibration damping support 10 constructed in the above manner, in an electric motor-driven vehicle it is possible to concomitantly achieve improved transmission efficiency of drive torque to the wheel assembly 20, and excellent vibration damping capability.

Specifically, first, by establishing a high spring constant in the drive torque reaction force input direction in the suspension bushings 32, 32, 32, 32 provided as the first vibration damping devices, diminished rotational drive power of the drive unit 12 due to absorption by the first vibration damping devices may be avoided. Rotational drive power of the drive unit 12 is thereby transmitted efficiently to the wheel assembly 20, and improved energy efficiency and operational feel may be attained.

Moreover, by establishing a high spring constant in the suspension bushings 32, 32, 32, 32 provided as the first vibration damping devices for coupled support of the drive unit 12 on the subframe 14, the rigid body resonance frequency with the drive unit 12 as the mass is set to high frequency. Further, as noted earlier, the rigid body resonance frequency with the subframe 14, inclusive of the load of the second vibration damping devices carried thereon, as the mass is set to 30 Hz or above, preferably 40 Hz or above. Thus, both in rigid body vibration with the drive unit 12 as the mass and in rigid body vibration with the subframe 14 inclusive of its carried load, exacerbated vibration associated with resonance may be prevented.

Specifically, in an internal combustion engine that experiences vibrating force due to torque fluctuations of about 20 Hz at low engine speed, it is necessary to set the resonance frequency of the support spring system of the power unit to around 10 Hz in order to achieve low spring characteristics in a frequency range of about 20 Hz; whereas in the drive unit 12 having the electric motor 18 as its drive source, torque fluctuations per se are smaller and higher in frequency. Thus, the resonance frequency (natural frequency) of rigid body vibration of either the drive unit 12 or the subframe 14 may be set to a high frequency range of 30 Hz or above, while avoiding exacerbated vibration associated with resonance.

As a result, with respect to the natural frequency f0 of the drive unit 12 or the subframe 14, effective vibration damping effect (vibration isolation effect) may be achieved in a frequency range of f0×√2 or above, against vibration or noise caused by drive torque fluctuations. Meanwhile, in a frequency range below the natural frequency f0 of the drive unit 12 or the subframe 14, high spring rigidity with respect to drive torque reaction force may be assured and drive efficiency improved, and additionally, displacement of the drive unit 12 or the subframe 14 in association with the vehicle driving over a bump for example may be minimized to provide improved vibration damping capability. In relation to vibration of the drive unit 12 or the subframe 14 caused by vibrating force from the wheel assembly 20 as well, because in the normal speed range the wheel assembly 20 rotates no more than 30 times per second, diminished vibration damping capability due to vibrating force from the wheel assembly 20 being amplified by rigid body resonance of the drive unit 12 or the subframe 14 may be avoided as well.

While spring constant is lower for the subframe mounts 42, 44, 46 than for the suspension bushings 32, average distance from the torque roll axis 40 of the drive unit 12 is greater for the subframe mounts 42, 44, 46 than for the suspension bushings 32, thereby preventing drive torque reaction force of the drive unit 12 from being absorbed by the subframe mounts 42, 44, 46.

Moreover, because bouncing vibration and pitching vibration of the subframe 14 are coupled, it is possible to avoid steep drops in vibration damping capabilities in the frequency range of the resonance peak. Additionally, because a high attenuation mount is employed for whichever of the subframe mounts 42 and 44 experiences larger amplitude during coupled resonance vibration, resonance peaks are effectively suppressed, providing further improvement of vibration damping capabilities.

Figure 4:
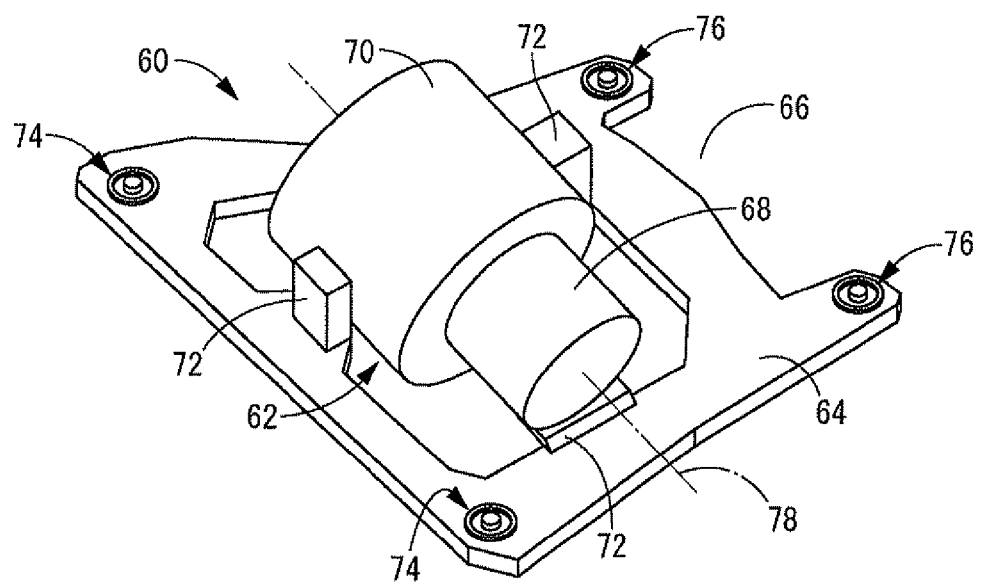
FIG. 4 is a schematic perspective view of a drive unit vibration damping support according to a second embodiment of the present invention.

FIG. 4 depicts a drive unit vibration damping support 60 for use in an electric motor-driven vehicle according to a second embodiment of the present invention. In this drive unit vibration damping support 60, a drive unit 62 is carried through support on a subframe 64, and is thereby supported in vibration damping fashion on a vehicle body 66 of an automobile via the subframe 64. That is, in contradistinction to the in-wheel motor structure shown in the first embodiment, the present embodiment has a structure wherein the drive unit 62 is carried through support on the vehicle body 66, and the drive power of the drive unit 62 is transmitted to the wheel assembly by a drive shaft or the like.

The drive unit 62 includes an electric motor 70 equipped with a shift gear mechanism 68. The subframe 64 is a high rigidity component made of steel or the like, having prescribed length in the vehicle lengthwise direction and a shape resembling a frame for example.

The subframe 64, when installed on the vehicle body 66, has prescribed length in the vehicle lengthwise direction; and the drive unit 62, when installed on this subframe 64, rests thereon with its output shaft oriented in the vehicle lateral direction. While not depicted in the drawing, the output shaft of the electric motor 70 is linked to the shift gear mechanism 68, and the output shaft of the shift gear mechanism 68 connects to the wheel assembly via a drive shaft or the like and transmits drive power to the wheel assembly, in comparable fashion to an FF vehicle with a transverse engine equipped with a conventional internal combustion engine.

The mounting portions for mounting the drive unit 62 onto the subframe 64 are respectively furnished with motor mounts 72, 72, 72 provided as the first vibration damping devices. Substantially the entire weight of the drive unit 62 is borne by the subframe 64 via the plurality of motor mounts 72, 72, 72 so that the drive unit 62 is supported in vibration damping fashion on the subframe 64.

Left/right pairs of front end subframe mounts 74, 74 and rear end subframe mounts 76, 76 provided as second vibration damping devices are installed on the subframe 64 at the front end and rear end of the vehicle. The subframe 64 is supported in vibration damping fashion on the vehicle body via these subframe mounts 74, 74, 76, 76. That is, the drive unit 62 is supported in vibration damping fashion on the vehicle body 66 by a duplex vibration damping arrangement provided by the plurality of motor mounts 72 and subframe mounts 74, 76.

As the motor mounts 72 it is possible to employ for example engine mounts of known type used with power units equipped with conventional internal combustion engines, for example, solid type rubber mounts such as those disclosed in JP-B2-4135915 or fluid-filled mounts such as those disclosed in JP-B2-3767323, making appropriate adjustments of spring constant.

Meanwhile, as the subframe mounts 74, 76 it is possible to employ mounts of comparable structure to the subframe mounts (42, 44) of the first embodiment for example.

Here, the motor mounts 72 have total spring constant about the torque roll axis 78 of the drive unit 62, that is greater than the total for the subframe mounts 74, 76. Specifically, the sum of the spring constants of the three motor mounts 72, 72, 72 in the direction of action of torque reaction force of the drive unit 62 is greater than the sum of the spring constants of the four subframe mounts 74, 74, 76, 76.

The four subframe mounts 74, 74, 76, 76 have a greater average value of separation distance from the torque roll axis 78 of the drive unit 62 than do the three motor mounts 72, 72, 72.

Furthermore, like the first embodiment, the front end subframe mounts 74 and the rear end subframe mounts 76 are designed such that coupled bouncing vibration and pitching vibration is produced in the subframe 64 inclusive of the load of the drive unit 62 etc. carried thereon. Additionally, in consideration of the vibration mode, the subframe mounts situated at either the front end or at the rear end of the subframe 64, specifically, whichever of these experience larger amplitude vibration at fundamental vibration, are imparted with greater attenuation coefficients than the other subframe mounts.

As in the first embodiment, coupling conditions of bouncing vibration and pitching vibration, as well as the magnitude of amplitude at fundamental vibration, may be easily derived using the two-degree-of-freedom vibration model depicted in FIG. 3. Where either the front end subframe mounts 74 or the rear end subframe mounts 76 are to have higher attenuation than the other mounts, a higher attenuation coefficient can be obtained by employing fluid-filled mounts for these former mounts.

Like the drive unit vibration damping support 10 of the first embodiment described previously, in the drive unit vibration damping support 60 constructed according to the present embodiment, torque transmission efficiency from the drive unit 62 to the wheel assembly is improved; and vibration damping capabilities are improved by avoiding exacerbated vibration caused by rigid body resonance of the subframe 64 carrying the drive unit 62, and by reducing noise etc. caused by motor torque fluctuations in the high frequency range.

While the present invention has been described in detail hereinabove in terms of the preferred embodiments, the invention is not limited by the specific disclosures thereof. For example, the support structure of the drive unit may additionally have a torque rod installed if needed. In this instance, one end of the torque rod is attached to the drive unit. The other end of the torque rod may be attached to the vehicle body, but in preferred practice is attached to the subframe. This assures higher levels of both torque reaction force and vibration damping capability.

By imparting different attenuation characteristics to the subframe mounts at the vehicle front end versus those at the rear end, it is possible to damp the maximum energy of vibration in the manner described in the preceding embodiments; however, it is also possible to employ a plurality of subframe mounts having identical characteristics, where to do so would not pose a particular problem.

The subframe structures and suspension structures, as well as the layout of the drive units herein, are merely exemplary and are not intended to be particularly limiting. Specifically, whereas the drive unit in the second embodiment has a transverse arrangement, the drive unit could instead have a longitudinal arrangement whereby the output shaft is oriented in the vehicle lengthwise direction.

Further, in the first embodiment, the upper end of the shock absorber 38 or the upper end of a coil spring disposed about the outside thereof may be supported by being attached directly to the vehicle body 16, rather than via the subframe 14. The reason is that it is not an intrinsic function of the shock absorber 38 or the coil spring disposed about the outside thereof to transmit drive torque reaction force.

The present invention is not limited to application in a drive unit vibration damping support for an electric car, and may be implemented analogously in an electric motor-driven rail car or self-propelled two-wheeled vehicle for example.

KEY TO SYMBOLS 10, 60: drive unit vibration damping support; 12, 62: drive unit; 14, 64: subframe; 16, 66: vehicle body; 18, 70: electric motor; 20: wheel assembly; 26: wheel assembly suspension member; 32: suspension bushing (first vibration damping device, suspension vibration damping device); 34: upper arm; 36: lower arm; 38: shock absorber; 40, 78: torque roll axis; 42, 44, 46, 74, 76: subframe mount (second vibration damping device); 72: motor mount (first vibration damping device)

The invention claimed is:

1. A drive unit vibration damping support for use in an electric motor-driven vehicle to provide vibration damped support of a drive unit including an electric motor on a vehicle body, comprising:
   a first vibration damping device being adapted to support the drive unit in vibration damping fashion on a subframe; and
   a second vibration damping device being adapted to support the subframe in vibration damping fashion on the vehicle body,
   wherein a spring constant of the first vibration damping device in a direction of input of torque reaction force of the electric motor is set to a greater value than a spring constant of the second vibration damping device; and
   wherein an average of a distance between a torque roll axis of the drive unit and the second vibration damping device is set to a greater value as compared with an average of a distance between the torque roll axis and the first vibration damping device.

2. The drive unit vibration damping support for an electric motor-driven vehicle according to claim 1, wherein:
   the subframe is supported in vibration damping fashion on the vehicle body by a plurality of the second vibration damping devices situated towards a front end and towards a rear end of the vehicle;
   support spring characteristics of the drive unit by the second vibration damping devices situated towards the front end differ from support spring characteristics of the drive unit by the second vibration damping devices situated towards the rear end; and
   pitching resonance and bouncing resonance in the subframe are generated in coupled fashion.

3. The drive unit vibration damping support for an electric motor-driven vehicle according to claim 2, wherein:
   in a fundamental mode of vibration arising from coupling of pitching vibration and bouncing vibration in the subframe, a node of a vibration mode is biased towards either one of the front end and the rear end of the vehicle; and
   of the plurality of second vibration damping devices situated towards the front end and the rear end of the vehicle, one of the second vibration damping devices situated a longer distance away from the node of the vibration mode have higher attenuation characteristics in a direction of input of pitching vibration and bouncing vibration, than another of the second vibration damping devices situated a shorter distance away from the node of the vibration mode.

4. The drive unit vibration damping support for an electric motor-driven vehicle according to claim 1, wherein the drive unit is loaded onto the subframe via the first vibration damping device, and the subframe is subjected to a weight of the drive unit in addition to the drive torque reaction force of the drive unit.

5. The drive unit vibration damping support for an electric motor-driven vehicle according to claim 1, wherein:
   the drive unit is installed inside a rim of a vehicle wheel to constitute an in-wheel motor structure; and
   the drive unit is connected to and supported on the subframe via a wheel assembly suspension member, and the first vibration damping device is constituted by a suspension vibration damping device disposed in a zone of transmission of the torque reaction force of the drive unit from the wheel assembly suspension member to the subframe.

6. The drive unit vibration damping support for an electric motor-driven vehicle according to claim 5, wherein at least one of a shock absorber and a spring installed between the vehicle wheel and the vehicle body is attached to the vehicle body via the subframe.

* * * * *